July 1, 1958 A. A. DICKE 2,841,266
PRESSURE FLUID OPERATING MECHANISM
FOR CALCULATING MACHINES
Filed March 16, 1955 8 Sheets-Sheet 4
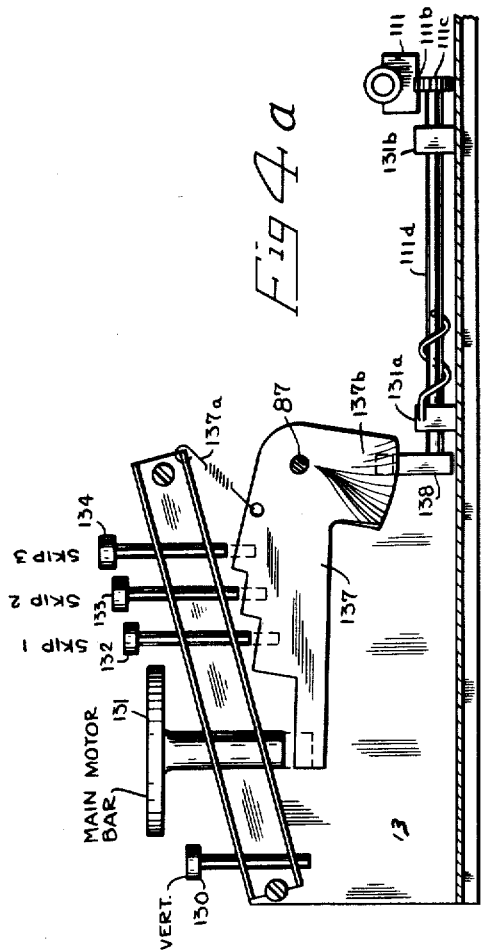
INVENTOR.
Allen A. Dicke July 1, 1958  A. A. DICKE  2,841,266
PRESSURE FLUID OPERATING MECHANISM
FOR CALCULATING MACHINES
Filed March 16, 1955  8 Sheets-Sheet 5

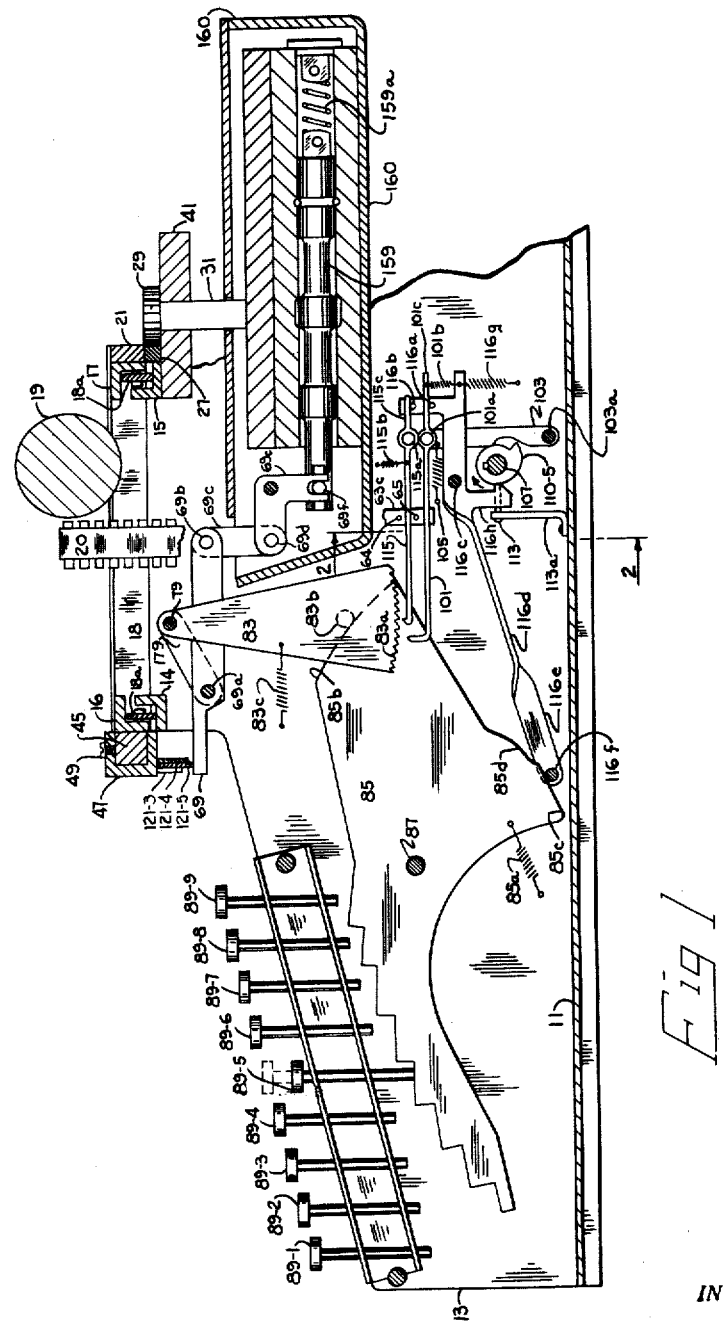

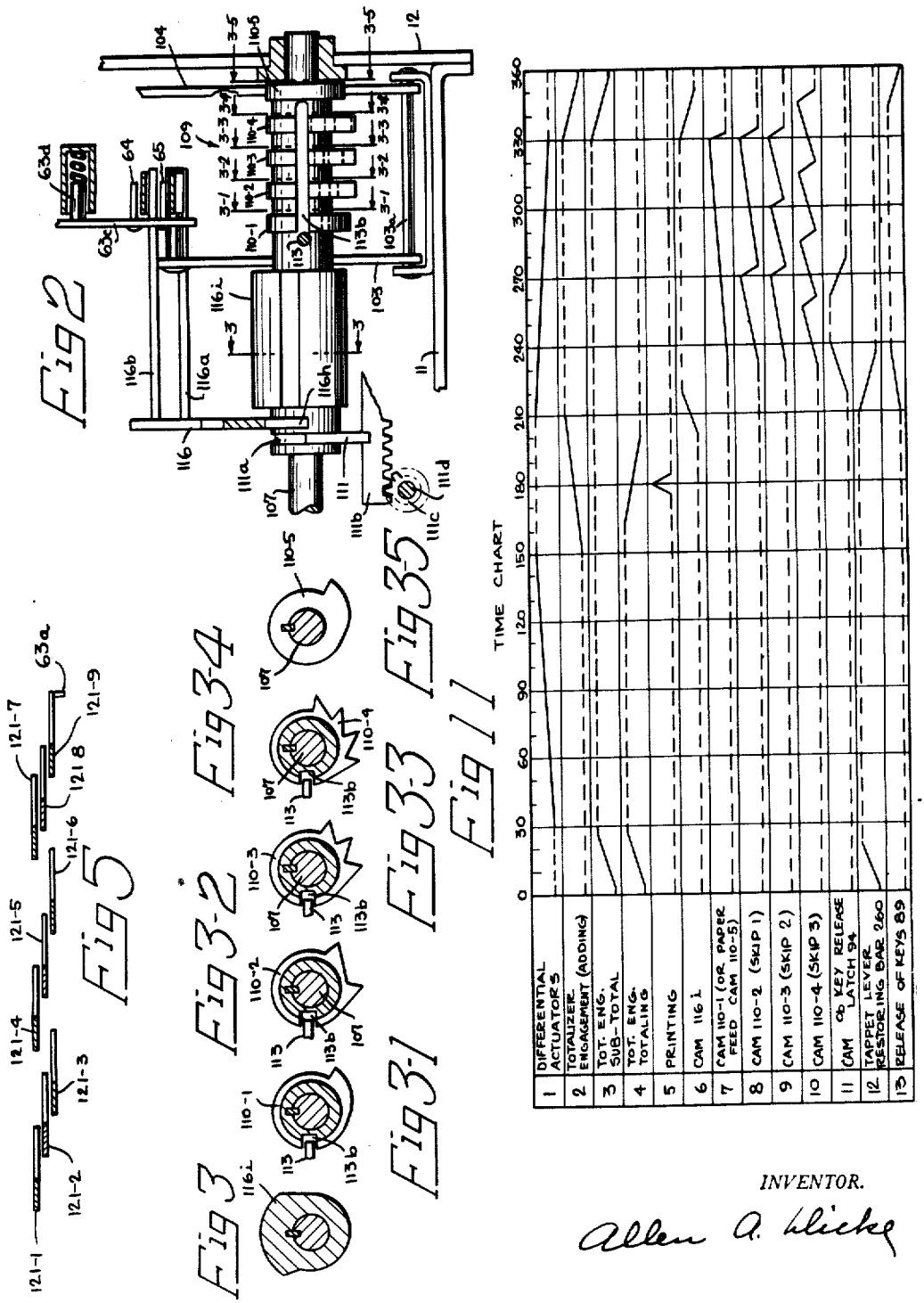

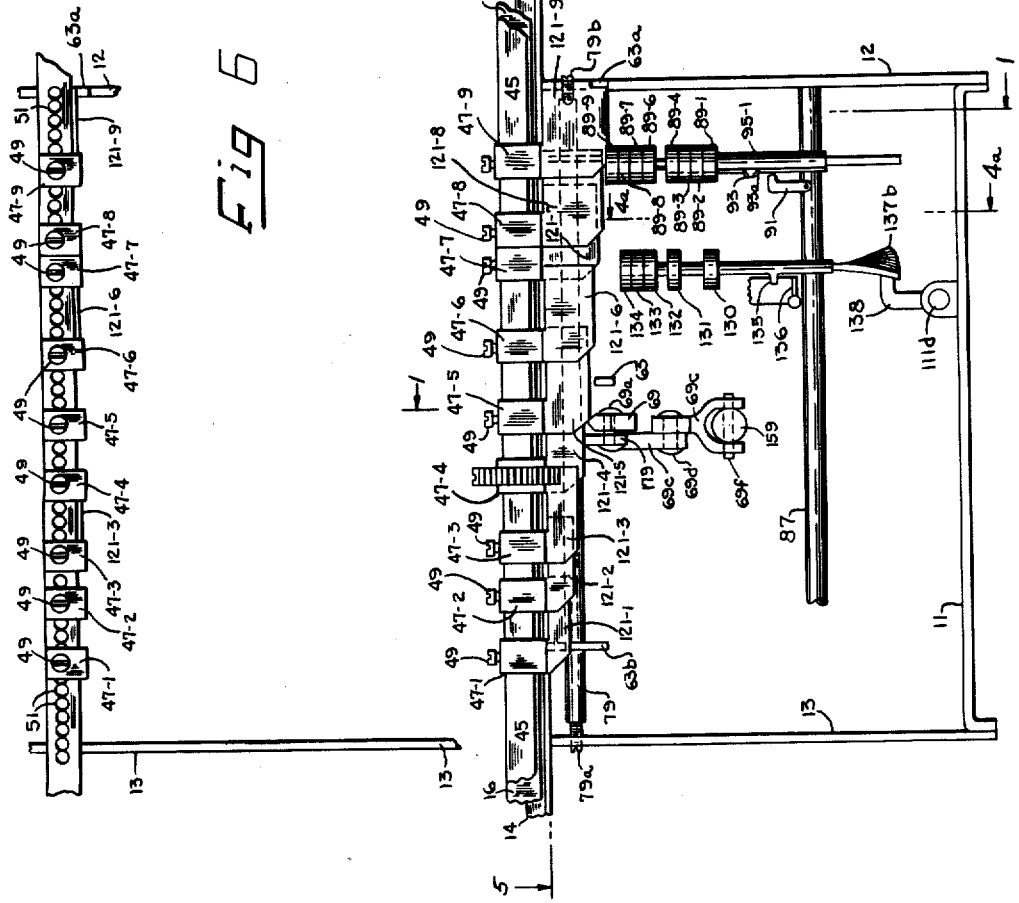

INVENTOR.
Allen A. Dicke

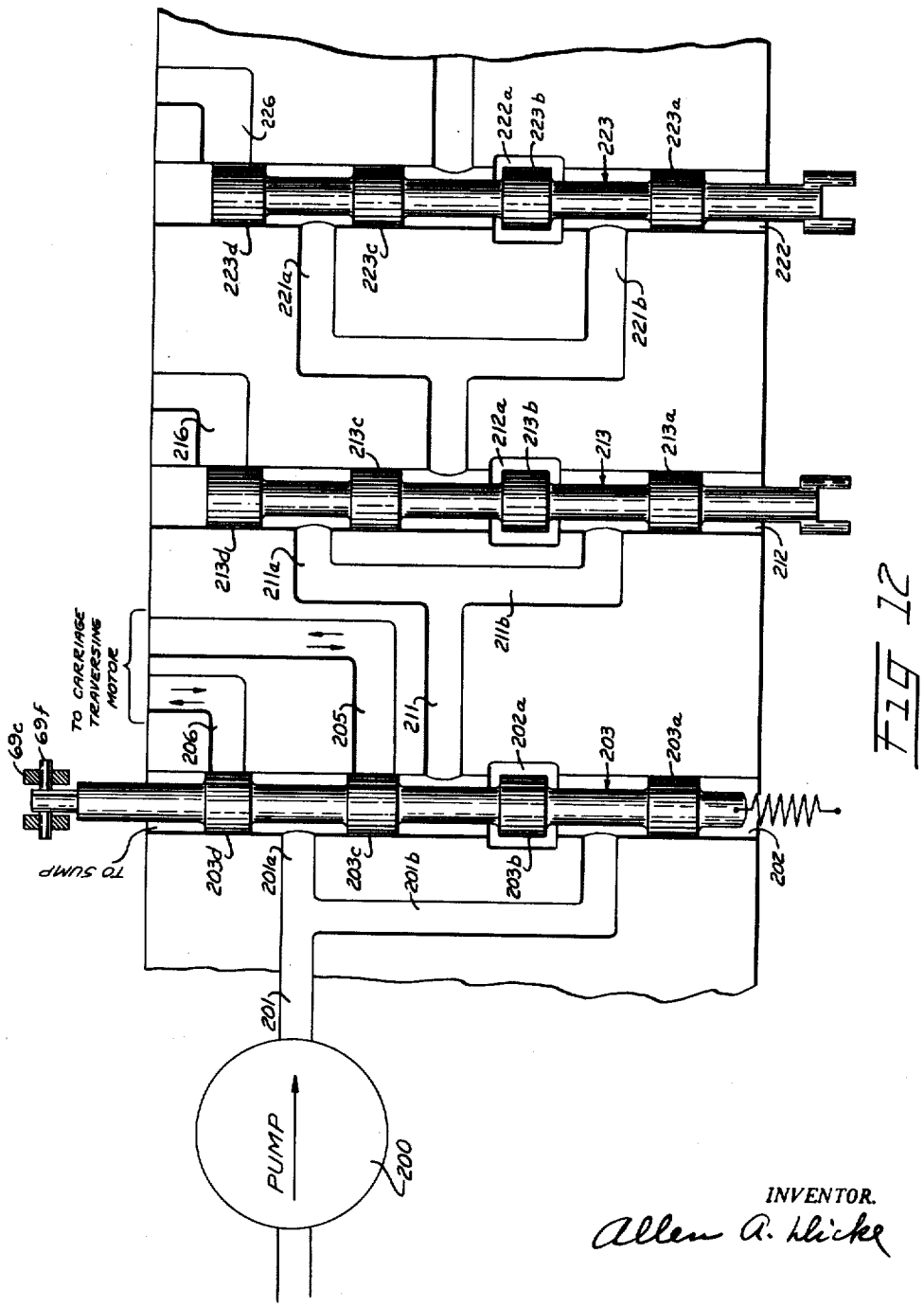

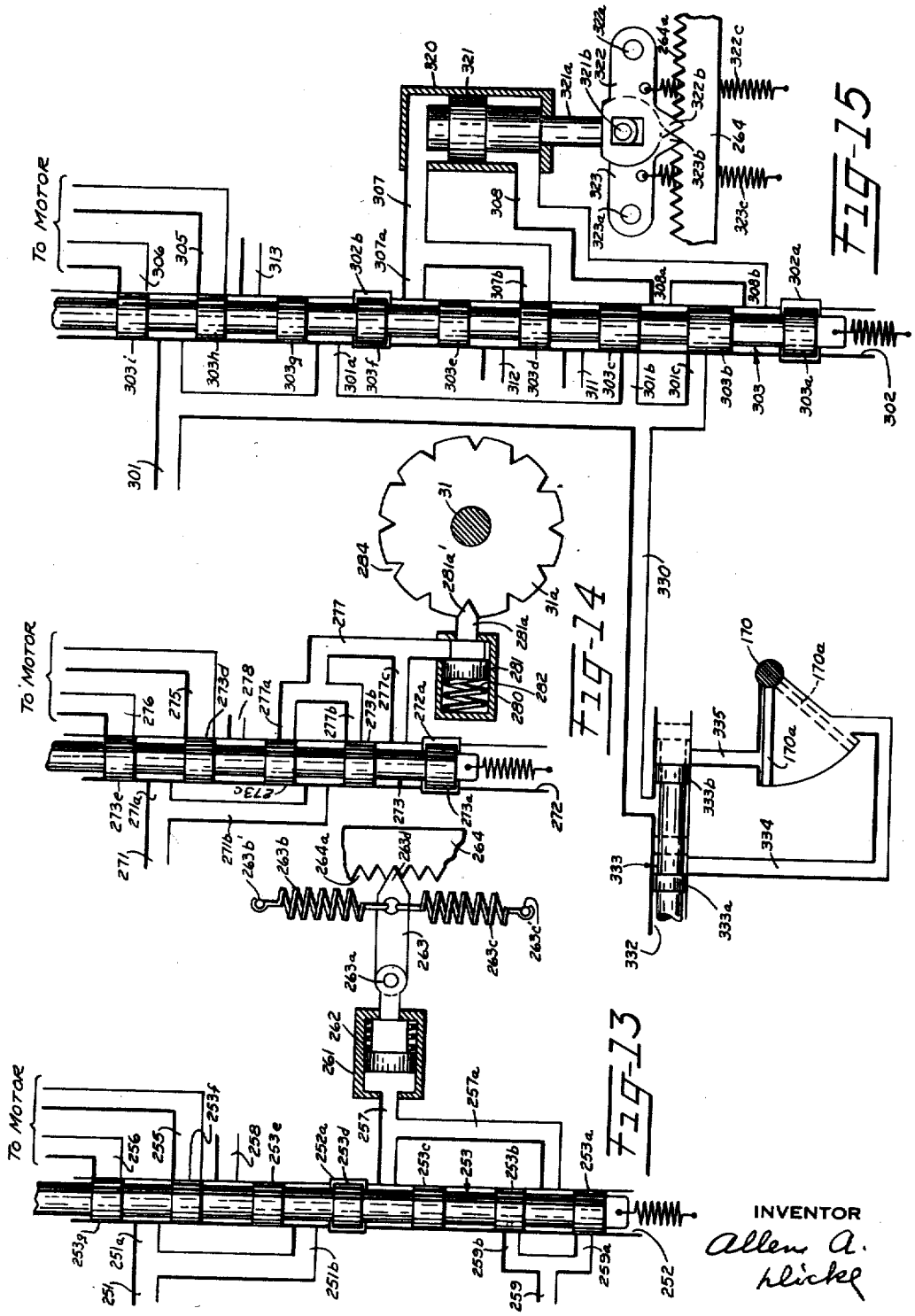

United States Patent Office 2,841,266
Patented July 1, 1958

2,841,266

PRESSURE FLUID OPERATING MECHANISM FOR CALCULATING MACHINES

Allen A. Dicke, New Bremen, Ohio

Application March 16, 1955, Serial No. 494,734

29 Claims. (Cl. 197—177)

This invention relates to pressure fluid operating mechanism for calculating machines and is a continuation in part of my copending application S. N. 216,943, filed March 22, 1951, Patent 2,709,511.

It has for an object to provide a simple effective mechanism for power traversing the carriage of such machines, in either direction, to one of a plurality of predetermined positions.

The invention is applicable to printing carriages which carry a platen which is traversed relative to printing elements for column or letter spacing. However, the inventon is applicable also to any type of calculating machine carriage such as the accumulator carriage in calculating machines of the Monroe, Marchant, Friden, and similar types. It may also be used to traverse carriages carrying totalizers of the interspersed type such as used in certain cash registers and accounting machines.

Another object is to provide an hydraulic carriage traversing mechanism which may cause the carriage to move from any position to any other position, in either direction in response to the control of a column selecting key, or the like.

Another object is to provide such a device in which the carriage is provided with a controlling cam or template, made up of one or more parts together with a feeler mounted on an adjustable support and cooperating with said template, said feeler being adapted to control a valve to cause the carriage to be moved by hydraulic power in the proper direction and to the proper extent to the position called for by the setting of the feeler.

Other objects relate to mechanism for setting the feeler support under the control of a lever, slide or keys and mechanism for advancing the setting of the feeler support one or more columnar positions as a result of the operation of the main operating mechanism of the calculating machine.

Another object is to provide a template formed by surfaces on cam plates carried by individual stop blocks adjustably supported on a replaceable stop bar mounted on the carriage, said plates lying in several different planes to permit telescoping relative to each other so that the stop blocks may be adjusted along the stop bar to a certain extent without disturbing the continuity of the template surface.

Another object is to provide such a device involving a continuously running driving motor together with a positive displacement reversible output member hydraulic transmission including a valve settable by a template controlled feeler which valve determines whether the output shaft rotates forwardly or reversely or is stationary.

Another object is to provide valve controlled hydraulic means for rotating the platen one or more steps for line spacing, which means is preferably operated by pressure fluid delivered by the pump which delivers pressure fluid for operating the carriage translating mechanism.

Another object is to provide a carriage stopping and aligning means which is actuated when the carriage approaches the position to which it is being moved, a construction which is especially useful when air is used as the pressure fluid.

Other objects will become apparent from the following description taken in connection with the attached drawings showing several illustrative embodiments of the invention and wherein:

Fig. 1 is a vertical longitudinal cross-section, on the line 1—1 of Fig. 4, of a machine illustrating one form the invention may take;

Fig. 2 is an enlarged partial cross-section taken along the line 2—2 of Fig. 1;

Fig. 3 is a cross-section along the line 3—3 of Fig. 2;

Figs. 3-1, 3-2, 3-3, 3-4 and 3-5 are cross-sections along the similarly designated lines in Fig. 2;

Fig. 4 is a fragmentary front elevation of the machine of Fig. 1;

Fig. 4a is a partial section on the line 4a—4a of Fig. 4;

Fig. 5 is a cross-sectional view taken on the line 5—5 of Fig. 4;

Fig. 6 is a fragmentary plan view of a part of the machine shown in Figs. 1–4;

Fig. 11 is a time chart;

Fig. 12 shows modified valve means;

Fig. 13 shows a modified form including a fluid pressure actuated carriage arresting and aligning mechanism;

Fig. 14 shows a further modification showing a spring actuated, pressure released carriage arresting and aligning mechanism; and Fig. 15 shows another modification in which the arresting and aligning mechanism is engaged and released by pressure fluid.

Figure 8:
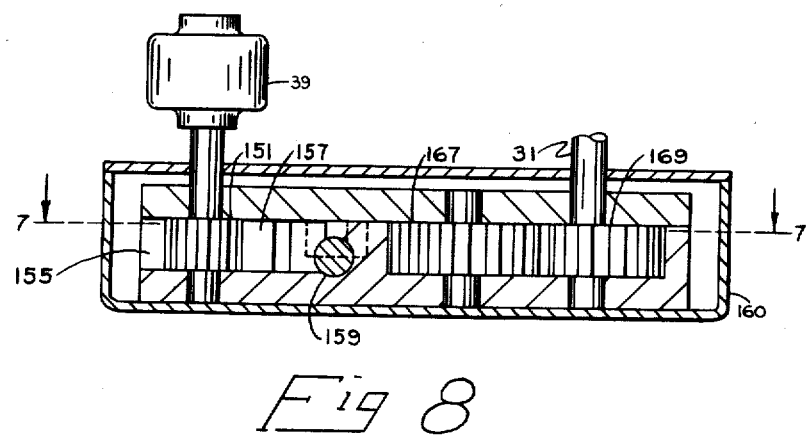
Fig. 8 represents a vertical cross-section taken on the line 8—8 of Fig. 7.

Referring to said drawings, and particularly Figs. 1 and 4 thereof, the numeral 11 designates a bottom plate, and 12 and 13 designate, respectively, the right and left side plates of a machine incorporating the invention in one form. Numerals 14 and 15 designate, respectively, the front and rear carriage supporting rails which are shown in the form of angle bars. 16 and 17 are, respectively, front and rear carriage frame members also formed of angle bars. 18 is a carriage cross member, one being provided at each end and upon which the platen 19 or other device is supported. 18a designates, say, four rollers mounted on the carriage and running on the rails 14 and 15. 20 designates generally type carrier mechanism which may be caused to print upon the platen. Carried by the member 17 or formed integral therewith is a stiffening bar 21. Carried by the rear carriage frame member 17 and possibly integrally therewith or with the bar 21, is a rack 27 with which constantly meshes gear 29 carried on shaft 31 which is driven by the hydraulic motor described hereinafter. The upper end of motor shaft 31 of the hydraulic motor is supported by a bracket 41 carried by the carriage supporting rail 15.

Detachably carried on the front carriage frame member 16, as by screws (not shown) is a stop bar 45 upon which are located a plurality of nine stop blocks 47-1 to 47-9, although any other number than nine may be employed. These stop blocks are of C-shape, as shown in Fig. 1, and are preferably held in position by set screws 49 each received in one of a series of conical recesses 51 in the top of the stop bar 45 (Fig. 6).

Figs. 1, 2, 4, 5 and 6 show a preferred form of template for determining the positioning of the carriage. The several stop blocks 47 are provided with cam plates 121–1 to 121–9. Plates 121–1, 121–4 and 121–7 lie in the same plane. Plates 121–2, 121–5 and 121–8 lie in the same plane with each other but forwardly of 121–1, 121–4 and 121–7. Likewise, plates 121–3, 121–6 and 121–9 lie in the same plane with each other but forwardly of the plane of 121–2, 121–5, 121–8. Thus, the lower edges of the plates 121–1 to 121–9 provide a continuous surface for a feeler 69 (described later) and this is possible whether or not the stop blocks 47–1 to 47–9 are close together or spread a substantial distance apart in accordance with the column spacing requirements of the particular accounting operation. These cams are so formed that the neutral position of the feeler 69 is about half way between the lower surfaces of the successive plates 121–1 to 121–9. The leftward edges of the plates 121–1 to 121–9 are inclined at an angle of, say, 45°, as shown. This provides a sensitive control of the feeler 69. This feeler is shown as pivoted at 69a on a lever 179 mounted on a shaft 79. The shaft 79 is supported by the side plates 12 and 13, preferably on pivots 79a and 79b, as shown, and carries a control ratchet plate 83, the lower edge of which is formed with ratchet teeth 83a, and also carries a stud 83b which may cooperate with a surface 85b of a key lever 85 pivotally supported on shaft 87 extending between the side plates 12 and 13. The key lever 85 is of the general type shown in W. S. Gubelmann Patent 1,429,-201, September 12, 1922. With that construction, the column selection keys 89–1 to 89–9 set the lever 85 in such a manner that the depression of key 89–2 will move the key lever 85 one step from its zero position and the successive keys will each cause one additional step of movement so that key 89–9 will cause eight steps of movement of key lever 85. In the position shown, key 89–5 is depressed and key lever 85 has been moved four steps causing ratchet plate 83, shaft 79 and lever 179 to be moved four steps from their most forward position, viz., to the "column 5" position. The keys are latched down when depressed by any suitable means such as by the latch wing plate 91 (Fig. 4), engaging over the shoulder 93 on the stem 95 of the respective key. Projection 93a assures that when any key is depressed, any previously depressed key will be released. It will be noted that key 89–1 cannot engage key lever 85 and its only purpose is to release any previously depressed key, thus setting key lever 85 into the "column 1" position where it is drawn by means of spring 85a. Unless prevented by other means to be presently described, ratchet plate 83 will then be able to assume its extreme forward position (column 1 position) under the bias of spring 83c. It will also be seen that the depression of any of the keys 89–2 to 89–9 will cause the key lever 85, and therefore the ratchet plate 83, shaft 79 and lever 179 to be moved a corresponding distance.

Figure 7:
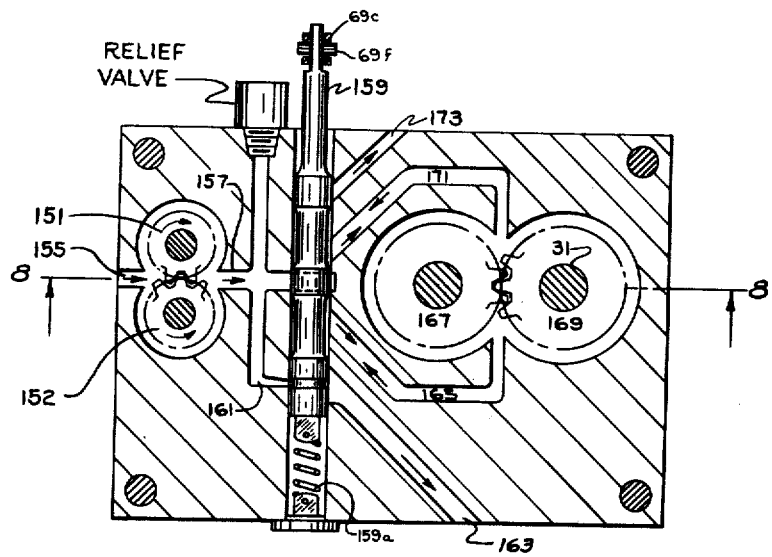
Fig. 7 is a horizontal cross-section of a modified construction employing an hydraulic transmission for traversing the carriage, taken on line 7—7 of Fig. 8.

Figs. 7 and 8 show a positive displacement hydraulic transmission for moving the carriage. The electric motor 39 constantly drives the pump which may consist of pump gears 151 and 152 which receive fluid (oil) through intake 155 and discharge it through delivery passage 157. The flow is controlled by a typical spool valve 159 biased inwardly as by tension spring 159a. In the position shown, the oil is discharged through passages 161 and 163. If, however, the spool 159 is moved (upwardly, Fig. 7 or to the left, Fig. 1), this discharge passage is closed and a passage is opened to the conduit 165 allowing oil to be applied to the motor gears 167, 169 causing them to rotate. The oil is discharged from the motor gears through passages 171 and 173, back to the sump. If the spool valve 159 is moved in the opposite direction, the discharge passage from 161 to 163 is closed and oil is admitted from passage 157 to passage 171, passes through the motor gears and through passage 165 and out through passage 163 causing the hydraulic motor to run in the reverse direction. Whenever the valve 159 is in the center position, the motor gears are locked against rotation by hydraulic locking.

The position of valve 159 is controlled by the feeler 69 operating on the surface on plates 121–1 to 121–9. The feeler 69, as stated above, is carried by a lever 179. The feeler lever 69 is pivoted at 69b to one end of link 69c whose other end is pivoted at 69d to one arm of a bell crank 69e whose other arm is pivoted to the valve 159 at 69f. The fulcrum point 69a of lever 69 is therefore adjusted in accordance with the position of the ratchet plate 83 (Fig. 1) and the means for setting the position of said plate 83.

The pump, motor and control valve mechanism are all enclosed in the sump 160 which contains the operating oil, so that any leakage oil from the pump, motor or valve means, remains in the sump.

Before describing a second means for controlling the position of plate 83, the function of the mechanism so far described will be explained.

In the position shown in Figs. 1 and 4, the carriage is in the No. 5 position. If, now, a higher valve key is depressed, say, 89–8, the key lever 85 will be moved three steps counter-clockwise and the ratchet plate 83 will be moved three steps to the rear. The pivot 69a is moved downward, permitting the spring 159a to draw valve 159 rearward (downward in Fig. 7), causing the hydraulic motor to run to drive the shaft 31 clockwise (Fig. 7) to drive the carriage forward (to the left, Fig. 4). This will continue until stop block 47–8 reaches the feeler 69, at which time the feeler is pushed down by template plate 121–8, just sufficiently far to move the valve 159 to its central position (Figs. 1 and 7) so that the hydraulic motor will be stopped and hydraulically locked, stopping and holding the carriage in the No. 8 position.

If, now, a lower value key is depressed, such as key 89–2, the key lever 85 will swing clockwise to the No. 2 position and ratchet plate 83 will, due to spring 83c, attempt to swing forward to the No. 2 position. This will cause the pivot 69a to rise, lifting the pivot point 69b and causing the valve 159 to move forward (Fig. 1), viz. upward in Fig. 7, causing the hydraulic motor to run to drive the shaft 31 counterclockwise (Fig. 7) causing the carriage to move rearwardly (to the right, Fig. 4). This continues until the No. 2 stop block reaches the feeler 69, at which time the valve 159 is moved to its central position as soon as feeler 69 rides down the inclined surface on plate 121–2, stopping the carriage in the No. 2 position. It will, therefore, be seen that upon the depression of any one of the keys 89–1 to 89–9 the carriage will be promptly moved to its corresponding columnar position, whether this be to the right or to the left of the previous carriage position, and will be held hydraulically in that position.

In calculating machines it is desirable to cause carriage tabulation forward one or more column spaces as an incident to the operation of the main operating mechanism of the machine. To accomplish this in the present machine, means are provided to ratchet the ratchet plate 83 rearwardly one or more steps upon each machine operation which requires carriage tabulation. To this end, operating pawl 101 (Fig. 1) is provided. It is pivoted at 101a to a lever 103 pivoted on pin 103a (Figs. 1 and 2) to the bottom of the machine and is biased counterclockwise by spring 105. Pawl 101 is biased clock-wise by spring 101b. 107 is the main operating shaft of the machine or any shaft which rotates in synchronism therewith in the direction shown. Feather keyed upon said shaft is a cam cluster 109 (see also Figs. 2, 3, 3–1, etc.) comprising five cam discs 110–1, 110–2, 110–3, 110–4 and 110–5 and a longer cam 116i. The cam cluster may be shifted on shaft 107 so as to bring into line with lever 103 the first, second, third or fourth cam discs 110–1, 110–2, 110–3 or 110–4 which are provided with one, two, three and four cam lobes, respectively, as shown in Figs. 3 to 3–5. Or, the cluster may be so shifted that none of said cam discs are lined up with lever 103 (as shown in Fig. 2). The fifth cam disc 110–5 is for the purpose of operating paper feed initiating mechanism when the cam cluster is so shifted as not to line up any of the first four cam discs with the lever 103. To this end there is provided the lever 104 (Fig. 2) which may be identical in form with lever 103 and mounted on the same pin 103a. Its upper end is connected to means, of known or suitable type, for turning the paper platen roll one or more steps, or for operating the paper feed control valve to be described later. It will be noted that when the cam cluster 109 is shifted toward the left one, two, three or four steps, cam 110–5 is not able to operate line spacing lever 104. The cam cluster 109 may be shifted by any suitable means such as a claw 111 engaging in the annular groove 111a, said claw being carried by a rack 111b operable by pinion 111c fixed to shaft 111d. The means for causing shifting may be a group of keys which may be designated as "Main Motor Bar," "Skip 1," "Skip 2," "Skip 3," and "Vert." Such keys will usually serve also to release the machine for operation and will control the setting or directly set a differential slide or lever which is connected to the shaft 111d to move the cam cluster to the position corresponding to the key depressed.

One form which this mechanism may take is shown in Figs. 4 and 4a. A row of machine release keys is provided, the key 130 being designated the "Vert." key and serving to release the machine but not to shift the cam cluster 109, so that line spacing will take place. Key 131 is designated the "Main Motor Bar" and when depressed causes the cam cluster 109 to shift to the left one step (Fig. 2) and thereupon to release the machine for operation. "Skip 1" key 132, "Skip 2" key 133, and "Skip 3" key 134 serve to move the cam cluster 109 to the left two, three or four steps, respectively, and also release the machine for operation.

Each of the keys 130–134 is shown formed with an extension or shoulder 135 (Fig. 4) which strikes a bail 136 just before the key depressed reaches the end of its stroke. The bail 136 operates machine releasing means (not shown) which may be of any known or suitable construction.

Underlying said keys 131–134 is a key lever 137 pivoted on cross shaft 87. Its upper edge is so formed that depression of key 131 gives the lever one step of movement against the pull of spring 137a, and depression of keys 132, 133 and 134 gives the lever two, three and four steps of movement respectively.

The lever 137 is shown as formed with a lower extension 137b which is bent into helical form (Fig. 4). Bearing against said helical extension is the end of lever 138 carried by shaft 111d (Figs. 2, 4 and 4a) supported in bearings 139a and 139b. A spring such as 140 is provided to urge the shaft 111d and connected parts clockwise as viewed in Figs. 2 and 4, so that the cam cluster 109 is held in the position shown in Fig. 2 unless one of the keys 131, 132, 133 or 134 is depressed, or the cam cluster is moved by other means such as by the main operating mechanism in response to the control of a tappet on the carriage as will be described later.

It will be seen therefore that the depression of any one of the keys 130–134 will cause the adding and listing machine to operate and that if key 130 is the one depressed, line spacing will occur so that a vertical column of figures is printed, and that if one of the keys 131–134 is depressed, the carriage will, after printing has occurred, be tabulated forward one, two, three or four column spaces, respectively, and that line spacing will not take place.

Means are provided to prevent the shifting of the cam cluster 109 during a machine operation. In the form shown, this comprises a pin 113 carried by some fixed part of the machine such as the bracket 113a (Fig. 1) which pin reaches into a slot 113b in the cam cluster. The projection is so located that it lies between adjacent cams or just outside of cam 110–1 when the cam cluster is in one of its operating positions. Therefore, the cam cluster will be locked in the axial position to which it has been set as soon as the shaft 107 starts its rotation. In the position shown in Fig. 2, the pin 113 is located just outside of cam 110–1 so that the cam cluster cannot move to the left after it has rotated from its home position. Movement further to the right is always prevented by the engagement of cam 110—5 with a suitable stop surface.

In the form shown, the ratchet member 83 is advanced one, two, three or four steps by providing cams having one, two, three or four lobes each of which causes the member 83 to be advanced one tooth. It is to be understood, of course, that the same result can be obtained by having each of the cams 110–1, 110–2, 110–3 and 110–4 formed with one lobe but of progressively greater radial extent so as to give progressively larger movements to the lever 103 and the pawl 101 so that the pawl will advance the ratchet member 83 one, two, three or four teeth at one machine operation.

When the machine is operated with any column in the printing position, the shaft 107 makes approximately ½ revolution before printing occurs (see Fig. 11, line 5), after which the lobe of the first cam (assuming that the cam 110–1 is lined up with lever 103) cams lever 103 rearwardly camming the pawl 101 to ratchet the ratchet plate 83 rearwardly one step (assuming that pawl 101 is in its upper effective position) After this rearward stroke of pawl 101, it again moves forward but the plate 83 is held in its next position by holding dog 115 pivoted at 115a to the frame of the machine and biased upwardly by spring 115b. Pawl 101 has a rearward extension 101c and holding dog 115 has a rearward extension 115c. These extensions cooperate with pins 116a and 116b, respectively, mounted on a lever 116 pivoted at 116c to the frame of the machine. This lever has a springy extension 116d and a further extension 116e which carries a stud 116f which cooperates with the surfaces 85c and 85d on the key lever 85. The parts are so proportioned that when the key lever 85 is in its extreme clockwise position, stud 116f lies against surface 85d whereupon the lever 116 is moved clockwise by spring 116g, lowering pins 116a and 116b and thereby allowing pawl 101 and holding dog 115 to rock clockwise to effective positions. Therefore, said pawl and dog are always in effective position when the key lever 85 is in its extreme clockwise position so that the ratchet plate 83 will be ratcheted rearward at each machine operation one, two, three or four steps (except when the cam cluster 109 is in line spacing position).

The lever 116 also has a downward extension 116h which cooperates with cam 116i (Figs. 2 and 3) on the revolution shaft 107. This cam is preferably part of the cam cluster 109 and is of such axial length that it will cooperate with extension 116h on any tabulating operation. A cam may also be provided on the revolution shaft which operates means to rock the latch plate 91 immediately after cam 116i rocks lever 116 in any tabulating operation to cause the release of any of the keys 89–1 to 89–9 which may have been depressed. (See Fig. 11, line 13.) Cam 116i may be used for this purpose to operate a lever (not shown) in the same transverse plane as extension 116h but about 10° later in the operation. Or a linkage may be provided which is operated to release the keys 89 when the lever 116 is rocked clockwise about its pivot 116c by the action of cam 116i.

Assuming that, with the parts in the position shown in Fig. 1, a machine operation involving tabulating occurs, the following will happen:

From about 30° to about 150° rotation of revolution shaft 107, the differential mechanism (which may be of any known or suitable type) is set in accordance with the values of any depressed amount keys and the printing type carriers 20 are set accordingly, whereupon printing occurs. Shortly thereafter (at about 200°) the projection 116*h* is cammed forwardly rocking lever 116 clockwise and permitting the pawl 101 and dog 105 to rise. Shortly thereafter, the depressed key 89–5 is released so that the lever 85 swings to the right. Ratchet plate is, however, held by dog 115. Immediately thereafter, the first tabulating cam pushes lever 103 rearwardly causing the pawl 101 to cam the plate 83 rearwardly one step (or two or three or four steps depending upon which of the cam discs 110–1, 110–2, 110–3, or 110–4 is lined up with lever 103). When plate 83 is given one or more steps of movement, feeler 69 is withdrawn from plate 121–5, permitting valve 159 to move rearwardly (Fig. 1) and causing the hydraulic motor to run forwardly, moving the carriage to the left. This will continue until the No. 6 stock block is in line with feeler 69 assuming that plate 83 was ratcheted forward one step. When this occurs, the plate 121–6 pushes feeler 69 down causing the valve 159 to return to its central position. This causes the hydraulic motor to be stopped and locked with the carriage in the No. 6 position. It will be noted that lever 116 is rocked clockwise even if pin 116*f* engages the higher surface 85*c*. This is permitted by the springy section 116*d*.

If, as a result of a tabulating operation when the carriage stands in the No. 9 position, the carriage moves still further to the left, the forward extension 63*a* of stop plate 121–9 will engage with carriage return trip 63 (shown in Fig. 4) which through suitable connections (not shown) serve to move down member 63*c* (Figs. 1 and 2) which is provided with pins 64 and 65 which serve to move the pawl 101 and dog 115 downwardly thus releasing the ratchet plate 83 which swings to the left under the action of spring 83*c*. This will allow feeler lever 69 to move counterclockwise so that spring 83*c* can move valve 15 forwardly (Fig. 1) viz. upwardly (Fig. 7) causing the shaft 31 to rotate in reverse (counterclockwise), returning the carriage to the No. 1 position. During this return movement feeler 69, shaft 79 and ratchet plate 83 move gradually clockwise (Fig. 1). To prevent re-engagement of pawl 101 and dog 115 before plate 83 has returned to the No. 1 position, the connections between 63 and 63*c* are subjected to friction to hold them in place. This may take the form of spring pressed plunger 63*d* (Fig. 2). After the plate 83 has reached the No. 1 position, finger 63*b* (Fig. 4) strikes 63 and restores it to normal position.

It will be noted that hydraulic means are disclosed for translating the carriage wherein a source of mechanical power (an hydraulic motor) is provided and connected to the carriage for translating the carriage in one or the other direction, together with valve means for controlling the application of the carriage translating force in either direction which controlling means is biased to normally effect carriage movement in one direction, but may be moved to cause carriage movement in the other direction, together with columnar controlling cams carried by the carriage and translated therewith which serve to set said valve means against its normal bias to a neutral position (or for movement in the other direction) together with means for variably setting the cam means to determine which of said columnar controlling cams shall set said valve means to neutral.

Figure 10:
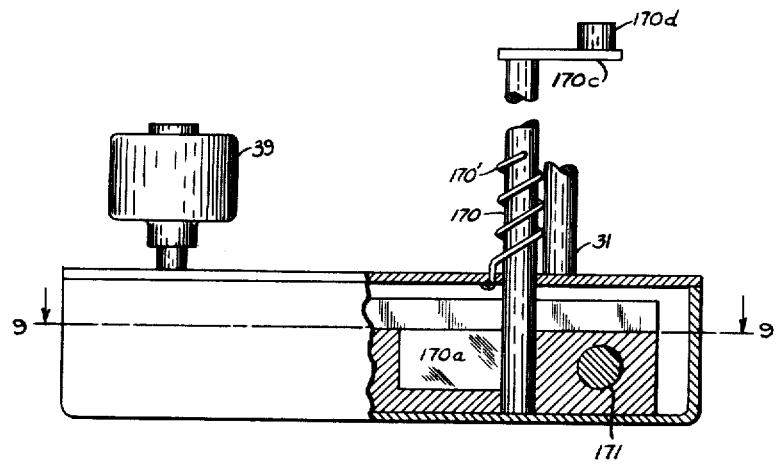
Fig. 10 is a view, partly in cross-section, along the line 10—10 of Fig. 9.
Figure 9:
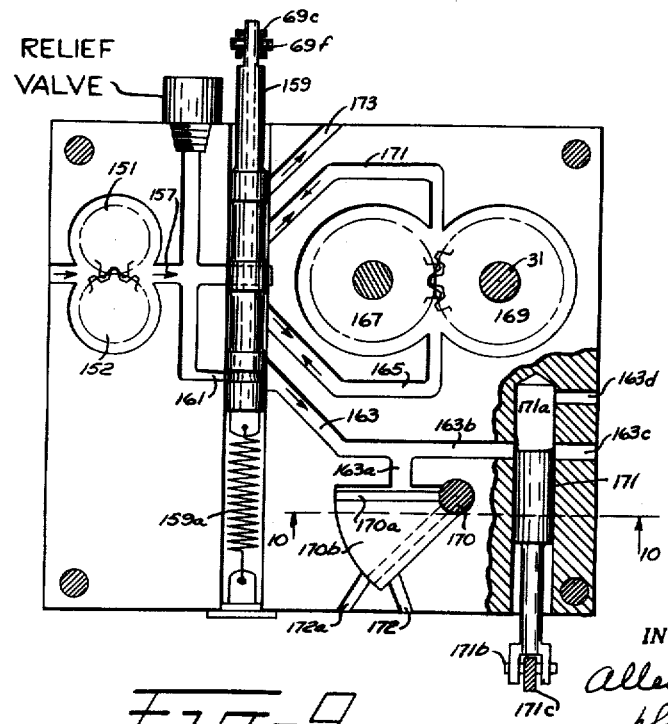
Fig. 9 is a cross-section similar to Fig. 7 of a modified form of construction including hydraulic means for effecting line spacing.

Figures 9 and 10 show the hydraulic means for causing carriage traverse and locking shown in Figs. 1, 7 and 8 and also show hydraulic means for causing some other operation such as causing the platen to rotate one or more steps for line spacing. For this purpose there may be provided a vertical shaft 170 to which is attached a vane 170*a* oscillatable in a segmental chamber 170*b*. The upper end of shaft 170 is connected for operating any known or suitable platen turning or line spacing mechanism. Thus it may be formed at its upper end with a crank 170*c* carrying a roller 170*d* for this purpose. This roller 170*d* may correspond to the roller 1705 shown in Figs. 4, 11, 36 and 37 of U. S. Patent to Butler, 2,627,333, and serve to actuate a line spacing bail mounted on the paper carriage, such as the bail 1247 shown in Figs. 4, 5, 11, 36 and 37 of said Butler patent.

Instead of having the passage 163 continuously open to the sump, as in Fig. 7, it may at times be closed by a control valve. This may take the form of the piston valve 171 movable in a bore 171*a*. The passage 163 has an extension 163*a* connecting to the space behind the vane 170*a* and another extension 163*b* extending to the valve bore 171*a*. Exit passages 163*c* and 163*d* extend from said valve bore to the sump. Connected to the piston valve at 171*b* is a suitable lever 171*c* connected by means (not shown) to the lever 104 (Fig. 2) in such a way that if and when lever 104 is rocked by cam 110–5 the piston valve 171 will be pushed upwardly (Fig. 9). This will cut off the oil discharge from the constantly running pump 151–152 to the sump and thus raise the oil pressure behind vane 170*a* causing the shaft 170 to rotate counterclockwise (Fig. 9), against the bias of a spring such as spring 170', thus moving the roller 170*d* to cause paper feeding. During this operation oil in front of the vane 170*a* flows out through the passage 172 to the sump, and after the vane has been swung as far as desired the fluid can escape to the sump through conduit 172*a* to avoid excessive pressure and shock and unnecessary load on the pump and electric motor.

As soon as the lobe on cam 110–5 has cleared lever 104 said lever is restored to its normal position by a suitable spring (not shown) so that valve 171 returns to the position shown in Fig. 9. The pressure behind vane 170*a* is relieved and spring 170' returns the shaft 170 and connected parts to the position shown in Figs. 9 and 10.

It will be noted that with the form of construction shown in Figs. 9 and 10 a single source of hydraulic power (such as the electric motor 39 and the pump 151, 152) may be used to operate two different mechanisms (the carriage traversing mechanism and the line spacing mechanism) and, at the same time, the pump and motor are relieved from unnecessary work as the hydraulic fluid can circulate freely when neither mechanism is operating.

Fig. 12 shows, more or less schematically, a modified form of construction in which a single pump and electric motor are used to supply operating fluid to three or more hydraulically actuated mechanisms and in which the motor and pump operate freely when none of said mechanisms is operating. The hydraulically operated mechanisms may be the carriage translating mechanism, the line spacing mechanism, paper throat mechanism and other mechanisms such as the main operating shaft, the printing mechanism or any other mechanism which requires considerable power.

Referring to Fig. 12, the numeral 200 indicates a pump which may operate continuously, drawing fluid from a sump, not shown, and delivering it to conduit 201, having branches 201*a* and 201*b*. 202 indicates a piston valve bore wherein is closely fitted a piston valve 203 having enlarged sections 203*a*, 203*b*, 203*c* and 203*d*. Section 203*b* is normally located at the center of a radial enlargement 202*a* in the bore 202 of greater axial length than section 203*b*. Section 203*c* is normally opposite a conduit 205 and section 203*d* is normally opposite a conduit 206. Conduits 205 and 206 may lead to a carriage traversing hydraulic motor such as the gears 167, 169, Fig. 7 or 9. A conduit 211 extends from bore 202 between enlarged sections 203*b* and 203*c*. This conduit would lead to the sump in a construction where no hydraulic operations, other than, say, carriage traversing are to be accomplished. In the form shown, however, it is formed with branches 211a and 211b leading to a second valve bore 212 wherein is closely fitted a piston valve 213 having enlarged sections 213a, 213b, 213c and 213 d. Section 213b is normally located at the center of a radial enlargement 212a in the bore 212 of greater axial length than section 213b. Section 213d is normally slightly below a conduit 216 which leads to a fluid operated device such as a hydraulic cylinder or a vane motor of the type shown in Fig. 9 for operating a line spacing or other mechanism. Branch conduit 211a connects with the space between enlargements 213c and and 213d and branch conduit 211b connects with the space between enlargements 213a and 213b. Conduit 221 connects with the space between the enlargements 213b and 213c. Conduit 221 would lead to the sump in constructions where no additional hydraulic operations are to be accomplished. In the form shown, however, it is formed with branches 221a and 221b leading to a third valve bore 222 wherein is closely fitted a piston valve 223 having enlarged sections 223a, 223b, 223c and 223d. Section 223b is normally located at the center of a radial enlargement 222a in the bore 222 of greater axial length than section 223b. Section 223d is normally slightly below a conduit 226 which leads to a fluid operated device such as a hydraulic cylinder or vane motor of the type shown in Fig. 9 for operating any mechanism desired to be operated periodically or under manual control. Branch conduit 221a connects with the space between enlargements 223c and 223d and branch conduit 221b connects with the space between enlargements 223a and 223b. Conduit 231 connects with the space between the enlargements 223b and 223c and leads to the sump or to another hydraulic device. Any number of such valve means and hydraulically operated devices may be used.

It is contemplated that valve 203 will be operated in either direction by a device such as bell crank 69e (Fig. 1) and that valve 213 will be moved upwardly at times by operation of lever 104 (Fig. 2). Likewise valve 223 will be moved upwardly by any suitable operation initiating means when required.

With the parts as shown in Fig. 12 the pump 200 will deliver fluid through conduits 201 and 201b to the space between enlargements 203a and 203b, around enlargements 203b through the enlarged space 202a into the space between enlargements 203b and 203c through the conduit 211, branch 211b, around the enlargement 213b through the enlarged space 212a and into conduit 221. In a similar way it will pass through the third valve and into conduit 231 to the sump. None of the hydraulically operable devices will be operated and the pump will operate freely against practically no pressure.

If now valve 203 is raised the enlargement 203b will cut off flow through conduit 201b, enlargement 203d will open conduit 201a to conduit 206 so that fluid will flow, say, to the carriage traversing hydraulic motor and operate it in one direction. The fluid will return from the motor through conduit 205 which is now open to conduit 211 due to the raising of enlargement 203c. The fluid passing through conduit 211 may flow to the sump if the valves 213 and 223 are in the positions shown. When the valve 203 is moved to its normal central position (Fig. 12) the carriage traversing motor will be stopped and hydraulically locked.

If now the valve 203 is moved downwardly the carriage traversing motor will be rotated in the opposite direction because the pressure fluid passes out through conduit 205 and returns through conduit 206 above the enlargement 203d to the sump.

If now, with valve 203 in central position, valve 213 is raised pressure fluid from the conduit 211 passes through branch conduit 211a into conduit 216 and to the pressure operated device connected thereto, causing the latter to be operated. When valve 203 is restored to normal position pressure fluid is cut off from conduit 216 so that the motor (such as vane 170a) can return under the action of its return spring, during which time the fluid can escape to the sump above the enlargement 213d. The operation of the parts controlled by valve 223 is the same as for valve 213.

It will be understood that air may be used instead of oil as an operating fluid and that the expression "hydraulic" is to be understood as including "pneumatic." Air has the advantage over oil that no fluid need be supplied, that no sump is needed and that leakage of the fluid does not present any difficulty. It, however, has the distadvantage that it can not supply the effect of a hydraulic lock and other means should be provided to arrest the carriage and hold it in predetermined position. This may be accomplished (whether air or oil is used as the pressure fluid) by constructions such as those shown in Figs. 13 and 14 and 15.

Referring to Fig. 13, 251 indicates a conduit for the supply of air (or oil) under pressure to branch conduits 251a and 251b. 252 indicates a valve bore in a suitable valve body, within which is closely fitted a valve piston 253 formed with enlarged sections 253a, 253b, 253c, 253d, 253e, 253f and 253g. Conduit branch 251a connects to the space between enlargements 253f and 253g and branch conduit 251b connects to the space between enlargements 253e and 253d which is normally located centrally of a radial enlargement 252a of the bore 252. Enlargements 253f and 253g are normally opposite conduits 255 and 256, respectively, which lead to a reversible fluid motor (air or oil). Conduit 258 is connected to the space between enlargements 253e and 253f and leads to the atmosphere, if air is the motive fluid or to the sump if oil is the fluid used. Conduit 257 connects to the space between enlargements 253c and 253d and its branch 257a connects to the space between enlargements 253a and 253b. Enlargements 253a and 253b are normally opposite branch conduits 259a and 259b, respectively, which lead to the atmosphere (or to the oil sump) as through conduit 259. Conduits 257 and 257a are connected to the outer end of a motor cylinder 260, which contains a piston 261 having a piston rod 261a. The piston is normally returned by a return spring 262.

Any suitable means are connected to the piston rod to arrest and align the carriage. This may be done by providing it with a wedge-shaped end, as in Fig. 14, to engage one of a plurality of notches on the carriage or on a member moving with the carriage, such as the disk 31a on shaft 31, Fig. 14. In the form shown in Fig. 13, a latch 263 is pivoted at 263a to the piston rod 261a and is biased to a central position as by springs 263b and 263c connected thereto and anchored at 263b' and 263c' respectively. The end 263d is wedge-shaped and may engage one of the notches 264a in the bar 264 which is attached to the carriage. Thus when piston 261 is driven forward by pressure fluid, the wedge-shaped end 263d of latch 263 will be driven into the proper notch 264a. If the notch has not quite reached the correct position, spring 263b or 263c will be extended momentarily. The momentum of the carriage will also cause one of said springs to be momentarily extended, but immediately thereafter the springs will cause the carriage to be positioned correctly. This construction reduces the shock which would otherwise be incidental to the arresting of the carriage.

With the valve 253 in the position shown in Fig. 13, no pressure is applied to the carriage translating fluid motor connected to conduits 255 and 256. Pressure is, however, exerted against piston 261, via conduit 251b through the enlargement 252a and through conduit 257. The pressure fluid can not escape through conduit 257a because enlargements 253a and 253b are opposite the conduits 259a and 259b respectively.

If now valve 253 is raised slightly, pressure fluid is admitted to conduit 256, passes through the motor, returns via conduit 255, passes below enlargement 253f and out through exit conduit 258. At the same time enlargement 253d has cut off the supply of pressure fluid to the cylinder and furthermore raising of enlargement 253b has opened the conduit 257a to conduit 259b so that fluid in the cylinder is free to escape while spring 262 drives the piston 261 toward the left to disengage latch 263 from notch 264a in bar 264, thus allowing the motor to move the carriage.

If valve 253 is moved downwardly, from the position shown, fluid passes through the motor in the opposite direction, enlargement 253d cuts off flow of pressure fluid to the cylinder and at the same time enlargement 253a opens a passage into conduit 259a, thus permitting the spring 262 to withdraw the latch 263.

Referring now to Fig. 14, 271 indicates a conduit for the supply of air (or oil) under pressure to branch conduits 271a and 271b. 272 indicates a valve bore in a suitable valve body, within which is closely fitted a valve piston 273 formed with enlarged sections 273a to 273e inclusive. Conduit branch 271a connects to the space between enlargements 273d and 273e and conduit branch 271b connects to the space between enlargements 273b and 273c. Enlargement 273a is normally located centrally of an enlargement 272a in the bore 272. Enlargements 273d and 273e are normally opposite conduits 275 and 276 respectively which lead to a reversible fluid motor (air or oil). Conduit 278 is connected to the space between enlargements 273c and 273d and leads to the atmosphere or to the sump if oil is used. Branch conduit 277a is normally opposite the lower end of enlargement 273c and branch conduit 277b is normally opposite to the upper portion of the enlargement 273b. Branch conduits 277a and 277b are connected to each other and to conduit 277 which leads to the forward end of a motor cylinder 280, which contains a piston 281 having a piston rod 281a. The piston is urged outwardly by a spring 282.

Any suitable means are connected to the piston rod 281a to arrest and align the carriage. In the forms shown in Fig. 14, this is done by providing it with a wedge-shaped end 281a' adapted to engage one of the notches 284 in the disk 31a attached to the carriage drive shaft 31.

With the valve 273 in the position shown in Fig. 14, no pressure is applied to the carriage translating fluid motor connected to the conduits 275 and 276. Furthermore no pressure is applied to the piston 281 because enlargements 273b and 273c close the connection from conduit 271b to conduit 277a or conduit 277b. Furthermore conduit 277 is without pressure because it is open to the atmosphere or sump through conduit 277c and around the enlargement 273a.

If now valve 273 is raised slightly, pressure fluid is admitted to conduit 276, passes through the motor, returns via conduit 275, passes below enlargement 273d and out through exit conduit 278. At the same time the raising of enlargement 273c admits pressure fluid to conduit 277a which raises the pressure in conduit 277 because the raising of enlargement 273a has shut off the exodus of pressure fluid from conduit 277c. The piston 281 is, therefore, driven inwardly so that the piston rod and nose 281a' is withdrawn from the effective notch 284, thus allowing the motor to move the carriage.

If valve 273 is moved downwardly from the position shown, fluid passes through the motor in the opposite direction, and the downward movement of enlargement 273b allows pressure fluid to flow through conduits 277b and 277 to the cylinder. Downward movement of enlargement 273a cuts off exodus of fluid from conduit 277c.

Referring to Fig. 15, 391 indicates a conduit for the supply of air (or oil) under pressure to branch conduits 301a, 301b and 301c. 302 indicates a valve bore in a suitable valve body, within which is closely fitted a valve piston 303 formed with enlarged sections 303a to 303i respectively. Conduit 301c is normally opposite the upper part of enlargement 303b, branch conduit 301b is normally opposite the lower part of enlargement 303c. Branch conduit 301a connects with the space between enlargements 303f and 303g and conduit 301 connects with the space between enlargements 303h and 303i. Relief conduit 311 connects with the space between enlargements 303c and 303d. Relief conduit 312 connects with the space between enlargements 303d and 303e. Relief conduit 313 connects with space between enlargements 303g and 303h. Enlargement 303a is normally located in the middle of the radially enlarged portion 302a of bore 302 and the enlargement 303f is normally located in the middle of the radially enlarged portion 302b. Enlargement 303d is normally opposite conduit 307b which joins with conduit 307a connecting with the space between enlargements 303e and 303f and also connects with conduit 307 leading to the cylinder 320 behind the piston 321, which has a piston rod 321a for operating carriage arresting and aligning means. Connected with cylinder 320 in front of the piston 321 is conduit 308 having a branch conduit 308a connecting with the space between enlargements 303b and 303c and branch conduit 308b connecting with the space between enlargements 303a and 303b.

While piston 321 may operate any desired carriage arresting and aligning means such as those shown in Figs. 13 and 14, the form shown in Fig. 15 comprises pawls 322 and 323 pivoted to the frame of the machine at 322a and 323a respectively. Said pawls are provided with noses 322b and 323b respectively for engagement in notches 264a on bar 264 carried by the carriage (or notches 284 in disk 31a, Fig. 14). Pawls 322 and 323 are normally biased toward the notches by springs 322c and 323c respectively. One of the pawls serves to arrest the carriage by engagement with one of the notches, while the other pawl serves to prevent rebound. The piston rod 321a is provided with a pin 321b operating in openings in the pawls 322 and 323. In the position of the piston 321 shown, the pin 321b has allowed the pawls to engage the notches but the pawls and are not positively held down. If, however, the piston 321 is moved rearwardly, both pawls are withdrawn from the notches.

With the valve 302 in the position shown, pressure fluid is not applied to the carriage translating fluid motor since enlargements 303h and 303i close off conduits 305 and 306 respectively. Fluid pressure is, however, applied behind piston 321 through conduit 301a, around enlargement 303f, through the radial enlargement 303b and through conduits 307a and 307. At this time conduit 307b is shut off by enlargement 303d. Fluid in front of the piston was able to escape through conduits 308 and 308b around the enlargement 303a, through the space 302a.

If now piston valve 303 is raised, pressure fluid flows into conduit 306 to the carriage translating motor. It returns from the motor through conduit 305, under the enlargement 303h and out of conduit 313 to the atmosphere or the sump. At the same time enlargement 303c has opened conduit 301b allowing pressure fluid to pass therethrough and through conduits 308a and 308 to the front side of the piston 321. At the same time, pressure fluid from conduit 301a is cut off from 307a by the enlargement 303f and fluid behind the piston can escape through conduits 307 and 307b, under enlargement 303d and out through conduit 311. The piston 321, therefore, raises and releases the carriage for movement by the fluid motor.

If the valve 303 is moved downwardly from the position shown, pressure fluid will pass from conduit 301 into conduit 305, through the motor and back through conduit 306 and be discharged above the enlargement 303i, causing the motor to run in the opposite direction. At the same time, pressure fluid is admitted from conduit 301c, above enlargement 303b, through conduits 308a and 308 to the forward side of piston 321. The fluid can not escape through the conduit 308b because the enlargement 303a has passed below the radial enlargement 302a. At the same time pressure fluid cannot pass from conduit 301a to conduit 307a because the enlargement 303f has moved below the radial enlargement 302b. At the same time enlargement 303d has moved downwardly and opened conduit 307b so that fluid behind the piston 321 can escape through conduit 312. It will be seen, therefore, that the piston 321 will be retracted to pull the pawls 322 and 323 out of the notches so that the carriage may be driven by the fluid motor.

Fig. 15 also shows a modified mechanism for effecting line spacing by fluid power. Thus 332 represents a valve bore in a suitable valve body, within which is closely fitted a piston valve 333 having enlargements 333a and 333b. Conduit 330 extends from any source of pressure fluid such as the conduit 301 to the space between the enlargements 333a and 333b. Conduit 335 normally communicates with the atmosphere and with the space behind the vane 170a attached to the shaft 170 described previously. Conduit 334 extends from the segmental chamber 170a to the space between enlargements 333a and 333b adjacent the enlargement 333a. It will be seen that with the parts in the position shown pressure is continuously applied to the rear side of the vane 170a, holding the vane in the position shown. However, if line spacing is to be effected, the valve 333 is moved to the position shown in dotted lines. This will permit pressure fluid to pass from conduit 330 to conduit 335 and will force the vane 170a to move to the dotted line position shown. Fluid in front of the vane will escape through conduit 334 to the atmosphere or sump. It will be noted that operation of shaft 170 is effected by fluid pressure in both directions. Momentary shifting of valve 333 to the dotted line position may be effected by any suitable means, such as a key on the keyboard and/or by the motion of lever 104 (Fig. 2) under the action of cam lobe 110-5.

It will be noted that the constructions shown and described will serve admirably to accomplish the objects stated above. It is to be understood, however, that the constructions disclosed above are intended merely as illustrative of the invention and not as limiting as various other modifications therein may be made without departting from the invention as defined by a proper interpretation of the claims which follow:

I claim:

1. In a calculating machine of the type having a frame member and a carriage translatable relative to said frame member to one of a plurality of different positions, the combination of a power source comprising a source of fluid under pressure, and driving means intermediate said source of fluid under pressure and said carriage comprising a fluid operated motor connected for translating said carriage relative to said frame member, together with valve means constructed to control the supply of pressure fluid to said fluid motor to drive said motor and carriage in one direction when said valve means is in one position and to control the supply of pressure fluid to said fluid motor to drive said motor and carriage in the other direction when said valve means is in another position and to supply no fluid to said fluid motor when said valve means is in a neutral position, cam-responsive means for controlling the position of said valve means, and cam means on said carriage and movable therewith serving to position said cam-responsive means and said valve means to neutral so that no pressure fluid is applied for moving said carriage, said cam means having effective surface areas in progressively different positions each defining a carriage position, said cam-responsive means being adjustable to progressively different positions each corresponding to one of said cam surface areas, whereby when the cam-responsive means is located in a certain position the carriage will be caused to move to the position corresponding to the position of said cam-responsive means, at which position the corresponding cam surface will cam said cam-responsive means to neutral to cause the valve means to be moved to neutral position.

2. The combination according to claim 1 together with manipulative means for positioning said cam-responsive means to one of a plurality of positions of adjustment.

3. The combination according to claim 1 together with manipulative means for positioning said cam-responsive means to one of a plurality of positions of adjustment, said manipulative means comprising a plurality of keys operable to set a differential member to set said cam-responsive means differentially.

4. The combination according to claim 1 together with manipulative means for positioning said cam-responsive means to one of a plurality of positions of adjustment, and a second means for positioning said cam-responsive means.

5. The combination according to claim 1 together with manipulative means for positioning said cam-responsive means to one of a plurality of positions of adjustment, and a second means for positioning said cam-responsive means by advancing the position of said cam-responsive means one or more steps at will.

6. The combination according to claim 1 together with means for advancing said cam-responsive means one or more steps at will.

7. The combination according to claim 1 together with means for advancing said cam-responsive means one or more steps at will, said last mentioned means comprising a ratchet and pawl mechanism.

8. In a calculating machine of the type having a frame member, a carriage translatable relative to said frame member to one of a plurality of different positions, and a platen on said carriage movable for line spacing, the combination of a power source comprising a source of fluid under pressure and driving means intermediate said source of fluid under pressure and said carriage comprising a fluid operated motor connected for translating said carriage relative to said frame member, together with valve means constructed to control the supply of pressure fluid to said fluid motor to drive said motor and carriage in one direction when said valve means is in one position and to control the supply of pressure fluid to said fluid motor to drive said motor and carriage in the other direction when said valve means is in another position and to supply no fluid to said fluid motor when said valve means is in a neutral position, means for controlling the position of said valve means, and means on said carriage and movable therewith serving to position said controlling means and said valve means to neutral so that no pressure fluid is applied for moving said carriage, together with a second fluid motor connected for operating means for line spacing said platen, and a second valve means to control the supply of pressure fluid to said second fluid motor.

9. In a calculating machine of the type having a frame member, a carriage translatable relative to said frame member to one of a plurality of different positions, and a platen on said carriage movable for line spacing, the combination of a power source comprising a source of fluid under pressure and driving means intermediate said source of fluid under pressure and said carriage comprising a fluid operated motor connected for translating said carriage relative to said frame member, together with valve means constructed to control the supply of pressure fluid to said fluid motor to drive said motor and carriage in one direction when said valve means is in one position and to control the supply of pressure fluid to said fluid motor to drive said motor and carriage in the other direction when said valve means is in another position and to supply no fluid to said fluid motor when said valve means is in a neutral position, means for controlling the position of said valve means, and means on said carriage and movable therewith serving to position said controlling means and said valve means to neutral so that no pressure fluid is applied for moving said carriage, together with a plurality of additional fluid motors connected for operating a corresponding plurality of calculating machine mechanisms and a corresponding plurality of valve means one for each of said additional plurality of fluid motors for controlling the supply of pressure fluid to the respective fluid motors.

10. In hydraulic drive means, a hydraulic pump, means for operating said pump to pump a fluid, a hydraulic motor, conduit means connecting said pump and motor, valve means in said conduit means for controlling the operation of said motor by fluid delivered by said pump, a vessel containing said pump, said motor, said valve means and operating fluid, said vessel being liquid-proof at the bottom and sides but provided with access openings at its top, together with driving means for said pump, operating means for said valve means and power delivery means from said hydraulic motor extending up through said access openings, whereby any fluid leaking from said pump, motor or valve means is retained in said vessel and may be recirculated by said pump.

11. In a calculating machine of the type having a frame member, a carriage translatable relative to said frame member to one of a plurality of different column positions, a rotable cylindrical platen on said carriage, printing mechanism for printing on paper on said platen, means for rotating said platen step by step for line spacing said paper, and a general operating mechanism serving to operate said printing mechanism, the combination of a power source comprising a source of fluid under pressure, and driving means intermediate said power source and said carriage comprising a reversible fluid operated motor connected for translating said carriage relative to said frame member, together with valve means constructed to control the supply of pressure fluid to said fluid motor to drive said carriage in one direction when said valve means is in one position, and to control the supply of pressure fluid to said fluid motor to drive said motor in the other direction when said valve means is in another position, and for supplying no fluid to said motor when said valve means is in a neutral position, cam-responsive means for controlling the position of said valve means and cam means on said carriage and movable therewith serving to position said valve means to neutral so that no pressure fluid is applied for moving said carriage, said cam means having effective surface areas in progressively different positions each defining a carriage position, together with means operated by said general operating mechanism for advancing said cam-responsive means at least one step at each operation of the general operating mechanism or for line spacing said platen.

12. The combination according to claim 11 in which the last mentioned means comprises a plurality of cams one of which may be made effective to advance said cam-responsive means or the other of which cams may be made effective to effect line spacing.

13. The combination according to claim 11 in which the last mentioned means comprises a plurality of cams one of which may be made effective to advance said cam-responsive means or the other of which cams may be made effective to effect line spacing, said cams forming a cam cluster feather-keyed on a shaft rotated by the general operating mechanism.

14. The combination according to claim 11 in which the last mentioned means comprises a plurality of cams one of which may be made effective to advance said cam-responsive means or the other of which cams may be made effective to effect line spacing, said cams forming a cam cluster feather-keyed on a shaft rotated by the general operating mechanism together with two cam operated members one adapted to advance said cam-responsive means and the other adapted to cause line spacing, said two cam operated members being so positioned that when the cam cluster is in one axial position one of said cams operates the cam operated member to advance said cam-responsive means and when said cam cluster is in another position the other of said cams operates the cam operated member which causes line spacing.

15. The combination according to claim 11 in which the last mentioned means comprises unitary cam means which may be made effective at will to advance said cam-responsive means or to effect line spacing.

16. The combination according to claim 11 in which the last mentioned means comprises unitary cam means which may be made effective at will to advance said cam-responsive means or to effect line spacing, said cam means forming a cam-cluster feather-keyed on a shaft rotated by the general operating mechanism.

17. The combination according to claim 11 in which the last mentioned means comprises unitary cam means which may be made effective at will to advance said cam-responsive means or to effect line spacing, said cam means forming a cam-cluster feather-keyed on a shaft rotated by the general operating mechanism together with two cam operated members one adapted to advance said cam-responsive means and the other adapted to cause line spacing, said two cam operated members being so positioned that when the cam cluster is in one axial position one member of said cam means operates the cam operated member to advance said cam-responsive means and when said cam cluster is in another position another member of said cam means operates the cam operated member which causes line spacing.

18. In a calculating machine of the type having a frame member, a carriage translatable relative to said frame member to one of a plurality of different column positions, a rotatable cylindrical platen on said carriage, printing mechanism for printing on paper on said platen, means for rotating said platen step by step for line spacing said paper, and a general operating mechanism serving to operate said printing mechanism, the combination of a power source comprising a source of fluid under pressure, and driving means intermediate said power source and said carriage comprising a reversible fluid operated motor connected for translating said carriage relative to said frame member, together with valve means constructed to control the supply of pressure fluid to said fluid motor to drive said carriage in one direction when said valve means is in one poistion, and to control the supply of pressure fluid to said fluid motor to drive said motor in the other direction when said valve means is in another position, and for supplying no fluid to said motor when said valve means is in a neutral position, and means on the carriage for controlling the position of said valve means, together with means operated by said general operating mechanism for rotating said platen.

19. In a calculating machine of the type having a frame member, a carriage translatable relative to said frame member to one of a plurality of different column positions, a rotatable cylindrical platen on said carriage, printing mechanism for printing on paper on said platen, means for rotating said platen step by step for line spacing said paper, and a general operating mechanism serving to operate said printing mechanism, the combination of a power source comprising a source of fluid under pressure, and driving means intermediate said power source and said carriage comprising a reversible fluid operated motor connected for translating said carriage relative to said frame member, together with valve means constructed to control the supply of pressure fluid to said fluid motor to drive said carriage to one direction when said valve means is in one position, and to control the supply of pressure fluid to said fluid motor to drive said motor in the other direction when said valve means is in another position, and for supplying no fluid to said motor when said valve means is in a neutral position, and means on the carriage for controlling the position of said valve means, together with means operated by said general operating mechanism for rotating said platen, the platen rotating means comprising a second fluid operated motor operable by pressure fluid, valve means for controlling the application of pressure fluid to said last mentioned fluid motor and means for operating said last mentioned valve means.

20. The combination according to claim 19 in which the last mentioned means comprises a cam operated by the general operating mechanism effective to operate said last mentioned valve means to effect platen rotation.

21. The combination according to claim 19 in which the last mentioned means comprises a cam operated by the general operating mechanism effective to operate said last mentioned valve means to effect platen rotation, together with means for determining whether said cam is to be effective or ineffective.

22. The combination according to claim 1 in which the cam-responsive means comprises a lever one portion of which is adapted to engage said cam surface areas, a pivoted support for said lever spaced from its engaging portion and means connected to a third part of said lever and connected for moving said valve means.

23. The combination according to claim 1 in which the cam-responsive means comprises a lever one portion of which is adapted to engage said cam surface areas, a pivoted support for said lever spaced from its engaging portion and means connected to a third part of said lever and connected for moving said valve means, together with means for adjusting the position of said pivoted support.

24. In a calculating machine of the type having a frame member and a carriage translatable relative to said frame member to one of a plurality of different positions, the combination of a power source comprising a source of fluid under pressure and driving means intermediate said source of fluid under pressure and said carriage comprising a fluid operated motor connected for translating said carriage relative to said frame member, together with valve means constructed to control the supply of pressure fluid to said fluid motor to drive said motor and carriage in one direction when said valve means is in one position and to control the supply of pressure fluid to said fluid motor to drive said motor and carriage in the other direction when said valve means is in another position and to supply no fluid to said fluid motor when said valve means is in a neutral position, means for controlling the position of said valve means, and means on said carriage and movable therewith serving to position said means and said valve means to neutral so that no pressure fluid is applied for moving said carriage, together with detent means for aligning said carriage, a second fluid motor connected for operating said detent means, said valve means being so constructed and arranged as to control said carriage aligning detent means to effective position when the valve means is in neutral position with reference to said carriage translating fluid motor.

25. The combination according to claim 24 in which the second fluid motor comprises a chamber, a member movable therein in pressure sealing relation to said chamber, a conduit leading from said pressure source to said chamber on one side of said movable member, a vent in said chamber on the other side of said movable member, and a spring to return said movable member when no pressure fluid is supplied through said conduit.

26. The combination according to claim 24 in which the second fluid motor comprises a chamber, a member movable therein in pressure sealing relation in said chamber, conduits leading from said pressure source to said chamber on opposite sides of said movable member, respectively, said valve being arranged to supply pressure fluid to one or the other side of said movable member while venting the side to which pressure fluid is not supplied.

27. The combination according to claim 24 in which the second fluid motor comprises a chamber, a member movable therein in pressure sealing relation to said chamber, a conduit leading from said pressure source to said chamber on one side of said movable member, a vent in said chamber on the other side of said movable member, and a spring to return said movable member when no pressure fluid is supplied through said conduit, the carriage aligning means being so arranged that the pressure fluid moves the aligning means to effective position and the spring moves the aligning means to ineffective position.

28. The combination according to claim 24 in which the second fluid motor comprises a chamber, a member movable therein in pressure sealing relation to said chamber, a conduit leading from said pressure source to said chamber on one side of said movable member, a vent in said chamber on the other side of said movable member, and a spring to return said movable member when no pressure fluid is supplied through said conduit, the carriage aligning means being so arranged that the pressure fluid moves the aligning means to ineffective position and the spring moves the aligning means to effective position.

29. In a calculating machine of the type having a frame member and a carriage translatable relative to said frame member to one of a plurality of different positions, the combination of a power source comprising a source of fluid under pressure and driving means intermediate said source of fluid under pressure and said carriage comprising a fluid operated motor connected for translating said carriage relative to said frame member, together with valve means constructed to control the supply of pressure fluid to said fluid motor to drive said motor and carriage in one direction when said valve means is in one position and to control the supply of pressure fluid to said fluid motor to drive said motor and carriage in the other direction when said valve means is in another position and to supply no fluid to said fluid motor when said valve means is in a neutral position, means for controlling the position of said valve means, and means on said carriage and movable therewith serving to position said means and said valve means to neutral so that no pressure fluid is applied for moving said carriage, together with detent means for aligning said carriage, a second fluid motor connected for operating said detent means, said valve means being so constructed and arranged as to control said carriage aligning detent means to effective position when the valve means is in neutral position with reference to said carriage translating fluid motor, together with a rotatable platen carried by said carriage, printing mechanism for printing on paper on said platen, and power means for rotating said platen for line spacing said paper comprising a third fluid operated motor connected for operating said platen rotating means, a conduit connecting a pressure source to said third motor and a valve in said conduit for controlling the application of said pressure fluid to said third motor.

References Cited in the file of this patent
UNITED STATES PATENTS

| | | |
|---|---|---|
| 731,872 | Echols | June 23, 1903 |
| 738,273 | Baer | Sept. 8, 1903 |
| 1,079,963 | Vogel | Dec. 2, 1913 |
| 1,881,471 | Gerling | Oct. 11, 1932 |
| 2,382,437 | Molly | Aug. 14, 1945 |